(12) United States Patent
Sakakibara

(10) Patent No.: US 9,768,625 B2
(45) Date of Patent: Sep. 19, 2017

(54) BATTERY PACK, AND METHOD FOR CONTROLLING THE SAME

(71) Applicant: MAKITA CORPORATION, Anjo-shi, Aichi (JP)

(72) Inventor: Kazuyuki Sakakibara, Okazaki (JP)

(73) Assignee: MAKITA CORPORATION, Anjo-shi (JP)

(*) Notice: Subject to any disclaimer, the term of this patent is extended or adjusted under 35 U.S.C. 154(b) by 157 days.

(21) Appl. No.: 14/753,602

(22) Filed: Jun. 29, 2015

(65) Prior Publication Data
US 2016/0006278 A1    Jan. 7, 2016

(30) Foreign Application Priority Data

Jul. 4, 2014  (JP) .................................. 2014-138740
Jul. 4, 2014  (JP) .................................. 2014-138742

(51) Int. Cl.
*H02J 7/00* (2006.01)
(52) U.S. Cl.
CPC .......... *H02J 7/0019* (2013.01); *H02J 7/0026* (2013.01); *H02J 7/0021* (2013.01)
(58) Field of Classification Search
CPC ....... H02J 7/0003; H02J 7/0004; H02J 7/0054
USPC ............................................. 320/112
See application file for complete search history.

(56) References Cited

U.S. PATENT DOCUMENTS

| | | | | |
|---|---|---|---|---|
| 2002/0014880 A1* | 2/2002 | McAndrews | ......... | H02J 7/0013 320/134 |
| 2004/0232884 A1* | 11/2004 | Vaillancourt | ...... | G01R 31/3655 320/132 |
| 2006/0006740 A1* | 1/2006 | Sugiyama | ................ | H02J 7/34 307/66 |

FOREIGN PATENT DOCUMENTS

JP    2014-017951 A    1/2014
JP    2014-038816 A    2/2014

* cited by examiner

*Primary Examiner* — Arun Williams
(74) *Attorney, Agent, or Firm* — Oliff PLC

(57) ABSTRACT

A battery pack in one aspect of the present disclosure comprises: a plurality of battery blocks, a plurality of conduction/interruption units, and a control unit. The control unit selects one battery block to be electrically connected to an external device from among the plurality of battery blocks, on the basis of detection results obtained from a state detection unit, and sets the conduction/interruption unit corresponding to the selected battery block to a conducting state.

17 Claims, 11 Drawing Sheets

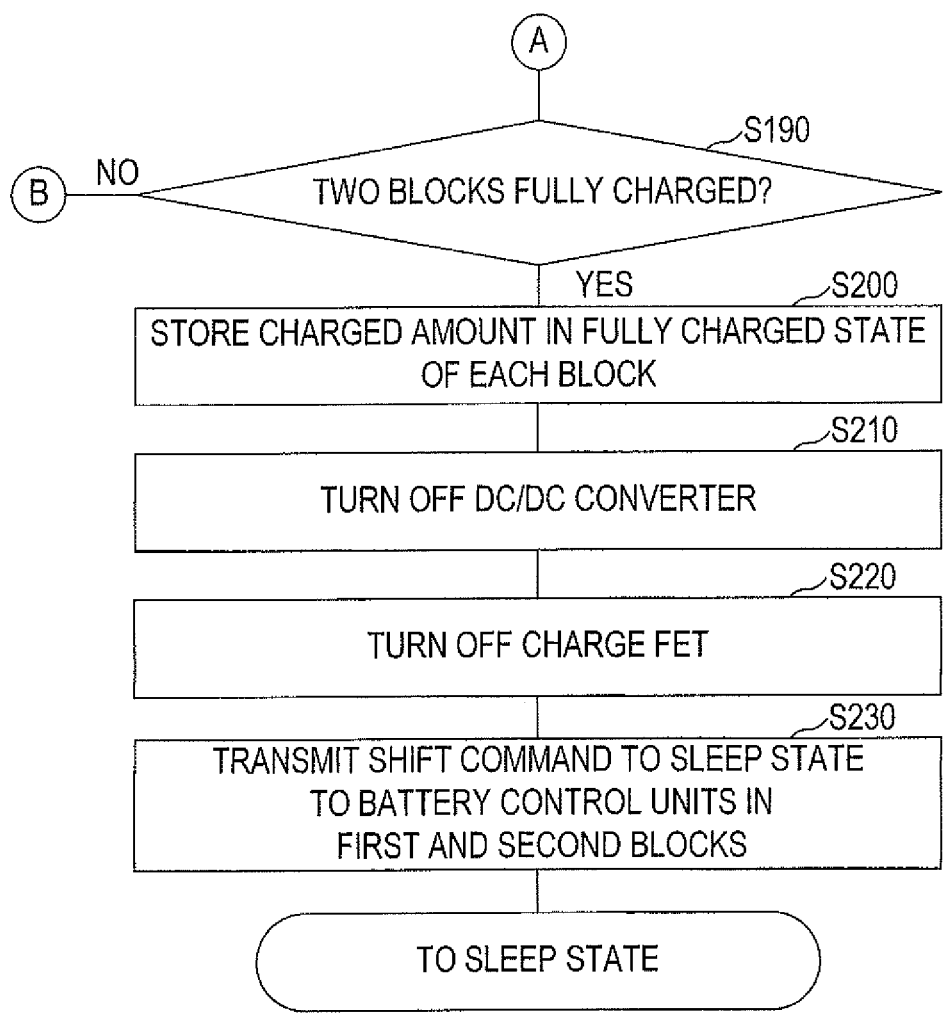

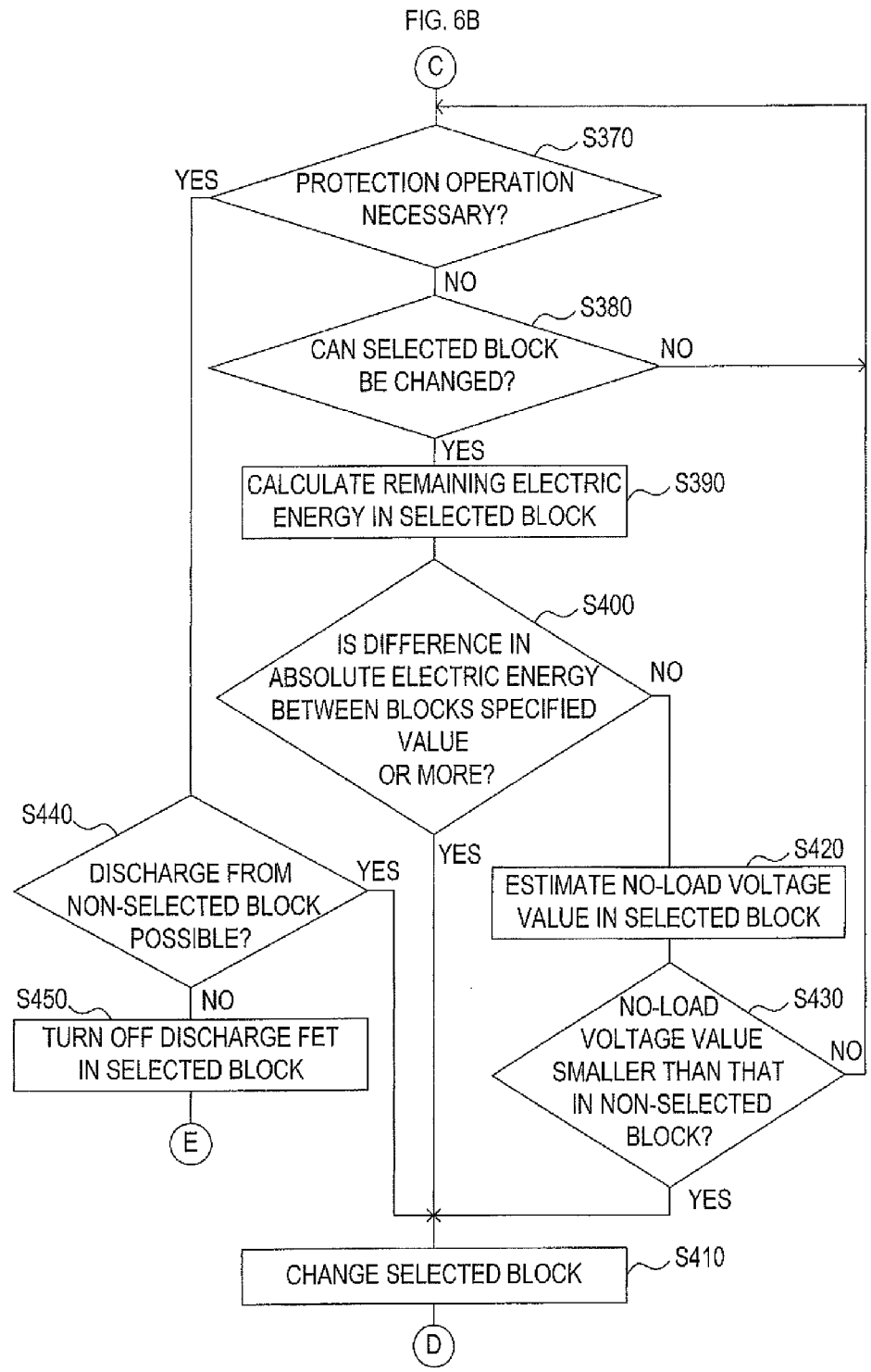

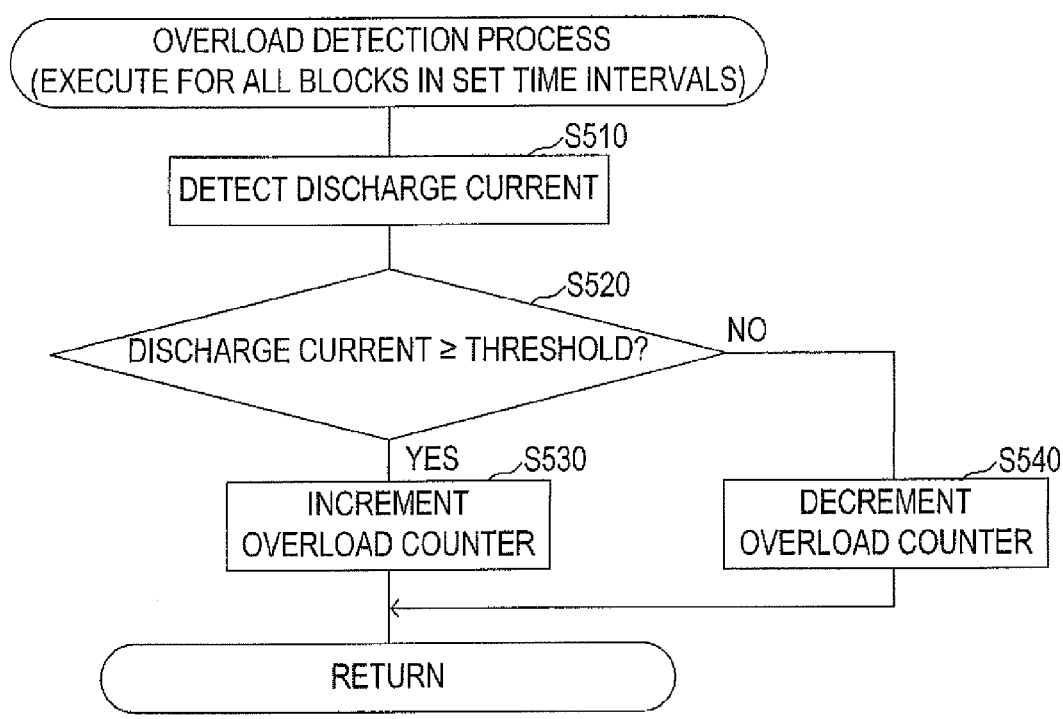

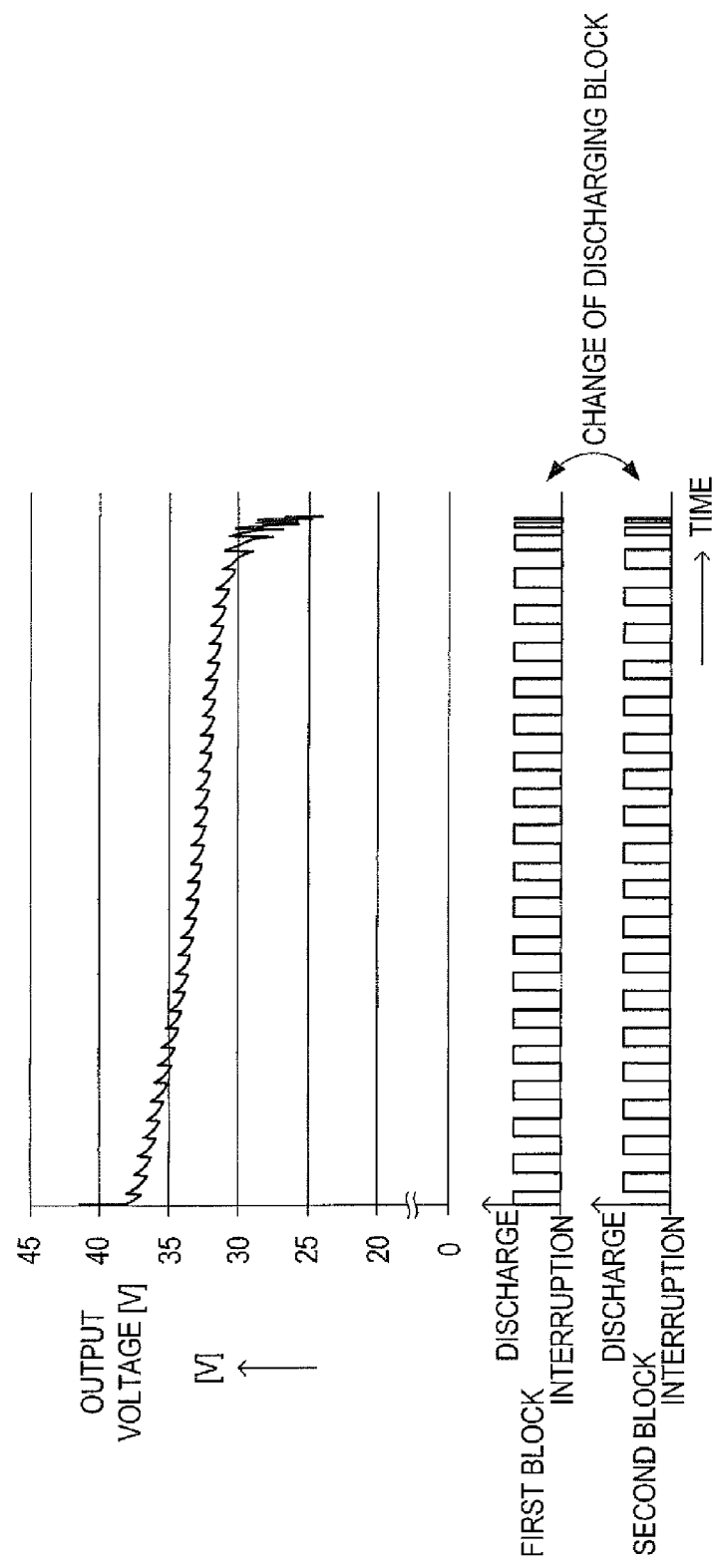

BATTERY PACK, AND METHOD FOR CONTROLLING THE SAME

CROSS-REFERENCE TO RELATED APPLICATIONS

This application claims the benefit of Japanese Patent Applications Nos. 2014-138740 and 2014-138742 filed Jul. 4, 2014 in the Japan Patent Office, and the entire disclosures thereof are incorporated herein by reference.

BACKGROUND

The present disclosure relates to a battery pack comprising a plurality of battery blocks.

Japanese Unexamined Patent Application Publication No. 2014-38816 discloses a backpack battery pack that supplies electric power to an external load, such as an electric power tool or the like. The battery pack is configured to be capable of housing a plurality of battery blocks in a case, in order to increase a storable electric energy (in other words, a battery capacity) in the battery pack. Also, the battery pack is configured to allow charging and discharging of the battery blocks to be performed simultaneously by parallely interconnecting the plurality of housed battery blocks.

SUMMARY

The aforementioned parallelly interconnected plurality of battery blocks, however, may result in a problem that variation in charged amount among the battery blocks causes flow of current from a specified battery block to another battery block, thereby degrading reliability of the battery pack. For example, in a case where an abnormality, such as a short circuit, has occurred to a specific battery block among the plurality of battery blocks, the remaining battery blocks may be discharged through the specific battery block.

Also, in the case of the battery pack including the parallelly interconnected plurality of battery blocks, an internal resistance of the entire battery pack may be lowered. Accordingly, for example, in the case of driving a motor of an electric power tool using the battery pack, reduction in a voltage to be applied to the motor is less than in the case of supplying electric power to the motor from a single battery block. The less reduction in the voltage to be applied to the motor results in a high voltage, which may allow a large current to flow in the motor, causing damage to the motor because of its high temperature, and thus degradation in reliability of the battery pack.

In one aspect of the present disclosure, it is desirable that charging to each of a plurality of battery blocks or discharging from each of a plurality of battery blocks can be performed safely, and thus improvement in reliability of a battery pack can be achieved.

A battery pack according to one aspect of the present disclosure comprises a plurality of battery blocks, a plurality of conduction/interruption units, and a control unit. Each of the plurality of battery blocks comprises a battery. Each of the plurality of conduction/interruption units corresponds to one of the plurality of battery blocks, is configured to be selectively settable to one of a conducting state and an interrupted state, and is provided between an external device to be connected to the battery pack and the corresponding battery block. The control unit selects one battery block to be electrically connected to the external device from among the plurality of battery blocks on the basis of detection results obtained from a state detection unit, and sets the conduction/interruption unit corresponding to the selected battery block to the conducting state. The state detection unit detects a state of each of the plurality of battery blocks.

According to the battery pack configured as above, simultaneous charging or discharging of the plurality of battery blocks is inhibited, and thus it is possible to inhibit current flow from a battery block having a higher output voltage to a battery block having a lower output voltage during charging or discharging. Also, it is possible to inhibit degradation of an external device during discharging to the external device, which may be caused by a lowered inner resistance of the entire battery pack due to parallel interconnection of the battery blocks, and the resulting increased output voltage from the battery pack to the external device. Accordingly, the above-described battery pack can provide an improved reliability.

The control unit may be further configured such that, when a difference between a remaining electric energy of the selected battery block and a remaining electric energy of at least one other battery block of the plurality of battery blocks becomes equal to or more than a specified value, after the external device and the selected battery block are electrically connected, the control unit sets the conduction/interruption unit corresponding to the selected battery block to the interrupted state and sets the conduction/interruption unit corresponding to the at least one other battery block to the conducting state.

In this case, it is possible to charge or discharge the battery blocks in a balanced manner such that the difference in the remaining electric energy between the battery blocks will not become equal to or more than the specified value.

At the time of charging to each of the battery blocks, a relative capacity with respect to a 100% electric energy when the battery block is fully charged may be used as the remaining electric energy of the battery block. At the time of discharging from each of the battery blocks, an actual electric energy in the battery block may be used as the remaining electric energy of the battery block.

If a battery block is in the fully-charged state or any abnormality has occurred to the battery block at the time of charging, charging to the battery block may be prohibited. Also, if the remaining electric energy of a battery block is small, or any abnormality has occurred to the battery block at the time of discharging, discharging from the battery block may be prohibited.

For this purpose, the control unit may be further configured to, when setting the conduction/interruption unit corresponding to the at least one other battery block to the conducting state, prohibit the conduction/interruption unit corresponding to the at least one other battery block from being set to the conducting state unless one of charging and discharging of the at least one other battery block is possible.

In this case, it is possible to inhibit obstruction of normal charging or discharging of a battery block that may be caused by changing the battery block to charge or discharge to other battery block, to thereby achieve improvement in safety of the battery pack during charging or discharging.

Further, the control unit may be configured to, when setting the conduction/interruption unit corresponding to the at least one other battery block to the conducting state, set the conduction/interruption unit corresponding to the at least one other battery block to the conducting state while keeping the conduction/interruption unit corresponding to the selected battery block set to the conducting state, and to subsequently set the conduction/interruption unit corresponding to the selected battery block to the interrupted state.

In this case, it is possible to inhibit, when changing the battery block to discharge to an external device, occurrence of a temporary stop (a so-called instantaneous interruption) of power supply to the external device due to simultaneous interruption of the discharge path of the currently selected battery block and the discharge path of the battery block to be selected next.

The control unit may be configured to estimate a no-load voltage of the selected battery block on the basis of an output voltage and a discharge current of the selected battery block, and to set the conduction/interruption unit corresponding to the selected battery block to the interrupted state and set the conduction/interruption unit corresponding to the at least one other battery block to the conducting state, when the estimated no-load voltage is lower than a no-load voltage of the at least one other battery block.

In this case, it is possible to inhibit significant change in the output voltage of the battery pack before completing the discharge from the battery pack; thus, it is possible to provide a battery pack that can drive an external device in a continuous and stable manner.

The control unit may be further configured to prohibit the conduction/interruption unit corresponding to the at least one other battery block from being set to the conducting state when a current value of a discharge current from the battery pack to the external device and a variation of an output voltage from the battery pack to the external device are equal to or greater than respective thresholds.

That is, by prohibiting change of the battery block to discharge to the external device if the current value of the discharge current to the external device and the variation of the output voltage to the external device are large, it is possible to supply power to the external device in a stable manner.

The battery pack may comprise a load state monitoring unit comprising a plurality of overload counters, each corresponding to one of the plurality of battery blocks, and being configured to monitor a load state of each of the plurality of battery blocks by incrementing each of the plurality of overload counters according to a discharge current flowing from each of the plurality of battery blocks.

In this case, the control unit may be configured to, when the overload counter corresponding to the selected battery block has reached an overload count value, prohibit the conduction/interruption unit corresponding to the selected battery block from being set to the conducting state. The overload count value may indicate an overload state of the corresponding battery block.

According to the battery pack configured as above, when a battery block discharging to an external device has reached an overload state, discharging from the battery block to the external device is prohibited; thus, it is possible to inhibit degradation of the battery pack due to the discharging.

The control unit may further be configured to, when the overload counter corresponding to the selected battery block has reached the overload count value, set the conduction/interruption unit corresponding to the selected battery block to the interrupted state and set the conduction/interruption unit corresponding to the at least one other battery block to the conducting state, if the overload counter corresponding to the at least one other battery block indicates a discharge enabling count value. The discharge enabling count value may represent that the corresponding battery block is dischargeable.

According to the control unit configured as above, when a battery block discharging to an external device has reached an overload state, the discharging to the external device can be continued using another battery block; thus, it is possible to supply power to the external device in a stable manner without degradation of any of the battery blocks.

When discharging from a battery block to an external device is prohibited, the overload counter of the battery block may be counted down depending on a time period while discharging is prohibited or the overload counter may be cleared. In this case, it is possible to restart discharging from the battery block, from which discharging was once prohibited, to the external device. Accordingly, by changing the battery block to be used for discharging as described above, it is possible to lengthen the time period in which power supply from the battery pack to the external device is available.

The battery pack may comprise a plurality of sets of a rectifier element and a switching element parallelly connected to each other. Each set of the plurality of sets of a rectifier element and a switching element parallelly connected to each other may correspond to one of the plurality of the conduction/interruption units, each rectifier element may be provided serially with respect to the corresponding conduction/interruption unit such that a direction of a discharge current to the external device is a forward direction of the rectifier element, and each switching element may be configured to be selectively settable to one of a conducting state and an interrupted state.

In this case, when one of the plurality of battery blocks is selected for discharging to an external device, and the corresponding conduction/interruption unit is set to the conducting state, it is possible to inhibit current flow from the selected battery block to any other battery blocks by means of the rectifier element.

Also, in this case, the battery pack may comprise a plurality of discharge detection units. Each of the plurality of discharge detection units may correspond to one of the plurality of sets, and may be configured to set the switching element of the corresponding set to the conducting state when the discharge current flows through the rectifier element of the corresponding set.

In this case, when the conduction/interruption unit corresponding to the selected battery block is in the conducting state, and a discharge current flows from the battery block to an external device, the discharge current is detected by the corresponding discharge detection unit, and the switching element of the corresponding set is set to the conducting state. Thus, it is possible to inhibit flow of a large current in the rectifier element of the corresponding set, and to inhibit degradation of the rectifier element.

The external device may comprise one of a charger and an electric working machine.

In a case where the external device comprises a charger configured to supply a first direct current to the battery pack, the battery pack may comprise a DC/DC converter configured to convert the first direct current to a second direct current that is required to charge the battery in each of the plurality of battery blocks.

In this case, it is possible to charge a battery using the charger configured to supply the first direct current different from the second direct current that is required to charge the battery. Also, since the charge path from the DC/DC converter to the battery is shortened, it is possible to reduce voltage drop (power loss) that may occur in the charge path, and to charge the battery in a stable and efficient manner.

The output voltage from the DC/DC converter may be set in accordance with its installed battery, and need not be adjusted in accordance with the plurality of batteries to be charged; thus, a simplified circuit configuration of the battery pack can be achieved.

Further, even in a case where the battery pack has a high rated voltage, e.g., a rated voltage higher than 40V, the output voltage from the charger to the battery pack may be low. Thus, an electric shock prevention structure of a connecting portion of the charger and/or the battery pack can be simplified or eliminated.

The battery pack may further comprise a common path interruption unit configured to interrupt a common current path. The common current path is configured such that currents flowing from the DC/DC converter to the respective plurality of battery blocks commonly flow therethrough and is provided between the DC/DC converter and the plurality of battery blocks.

In this case, charging to all of the batteries can be stopped collectively by activating the common path interruption unit, and thus an improved safety in case of an abnormality in a charging system can be achieved.

The battery pack may comprise a circuit board on which the plurality of battery blocks, the plurality of conduction/interruption units, the control unit, and the DC/DC converter are mounted.

In this case, an improved workability in placing components of the battery pack in a housing.

Another aspect of the present disclosure is a method for controlling a battery pack provided with a plurality of battery blocks. The method comprises: providing a plurality of conduction/interruption units, each corresponding to one of the plurality of battery blocks, being configured to be selectively settable to one of a conducting state and an interrupted state, and being provided between an external device to be connected to the battery pack and the corresponding battery block; detecting respective states of the plurality of battery blocks; selecting one battery block to be electrically connected to the external device from among the plurality of battery blocks on the basis of detection results of the respective states of the plurality of battery blocks; and setting the conduction/interruption unit corresponding to the selected battery block to the conducting state.

According to the control method as above, charging to each of a plurality of battery blocks or discharging from each of a plurality of battery blocks can be performed safely, and thus improvement in reliability of a battery pack can be achieved.

BRIEF DESCRIPTION OF THE DRAWINGS

An exemplary embodiment will be described hereinafter by way of example, with reference to the accompanying drawings, in which:

FIG. 5B is a flowchart showing the rest of the charge control process;

FIG. 6B is a flowchart showing the rest of the discharge control process;

FIG. 7 is a flowchart showing an overload detection process;

FIG. 9 is a time chart showing changes in output voltage during discharging.

DETAILED DESCRIPTION OF THE PREFERRED EMBODIMENTS

A battery pack 2 of the present embodiment is configured to supply electric power to an electric working machine, such as an electric power tool and an electric grass cutter, which is configured to be used by a user holding the same by hand.

Figure 1:
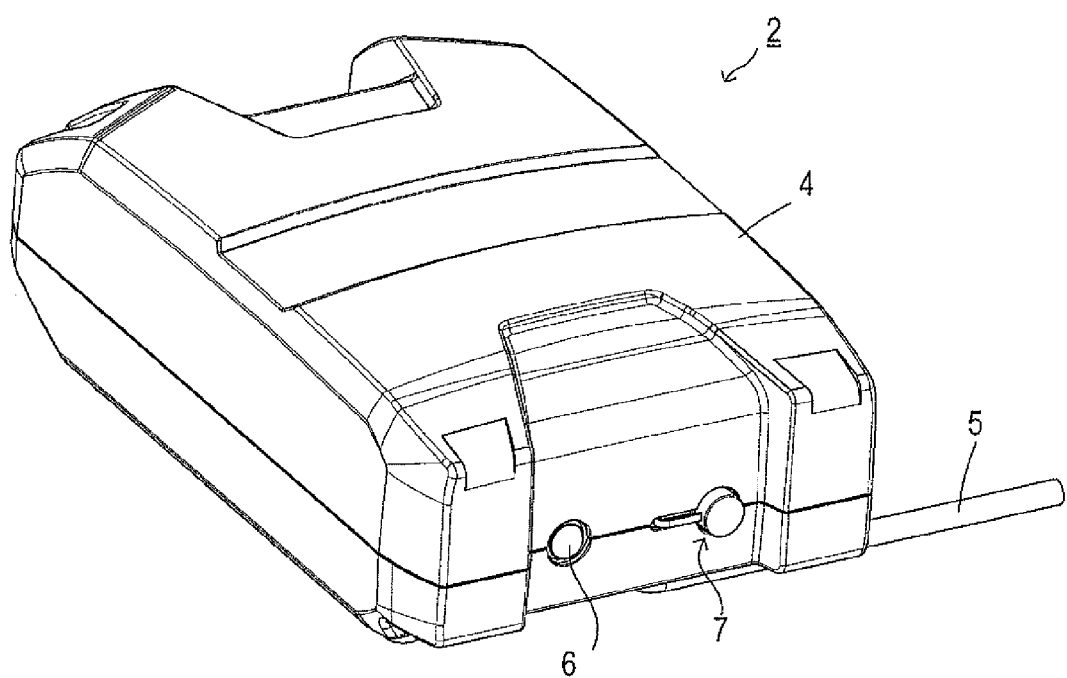
FIG. 1 is a perspective view showing an appearance of a battery pack of the exemplary embodiment.
Figure 2:
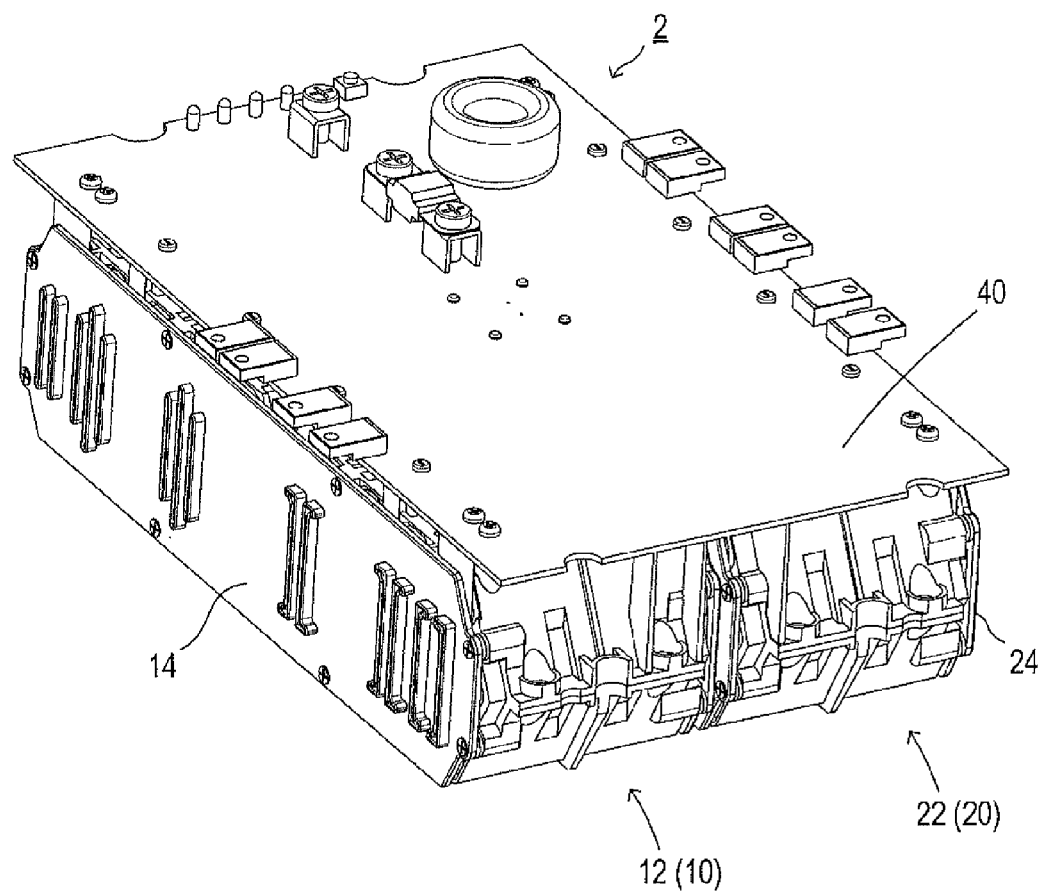
FIG. 2 is a perspective view showing an internal configuration of the battery pack.

As shown in FIGS. 1 and 2, the battery pack 2 comprises two battery blocks (a first block 10 and a second block 20) housed in a case (housing) 4 made of synthetic resin. The first block 10 comprises a battery 12, whereas the second block 20 comprises a battery 22.

Each of the batteries 12 and 22 may have a larger capacity (for example, 6 Ah) and may have a larger weight and volume than a battery to be used in a state of being attached to an electric power tool. In this case, the case 4 may be configured such that the user can carry the case 4 using a belt.

A main power switch (hereinafter referred to as a main SW) 6 to allow power supply (discharge) to an external device through a power supply cord 5, and a charging connector 7 to receive a DC voltage for charging from a charging adaptor 9 are provided at a side wall (on the front side in FIG. 1) of the case 4.

The charging connector 7 may be covered with a cap for waterproof purpose. The charging adaptor 9 to be connected to the charging connector 7 may comprise, as exemplified in FIG. 3, an AC/DC converter configured to receive a power-supply voltage (alternate current) from a commercial power source through an AC plug 8, to convert the power-supply voltage to a specified DC voltage, and to output the specified DC voltage.

Figure 4:
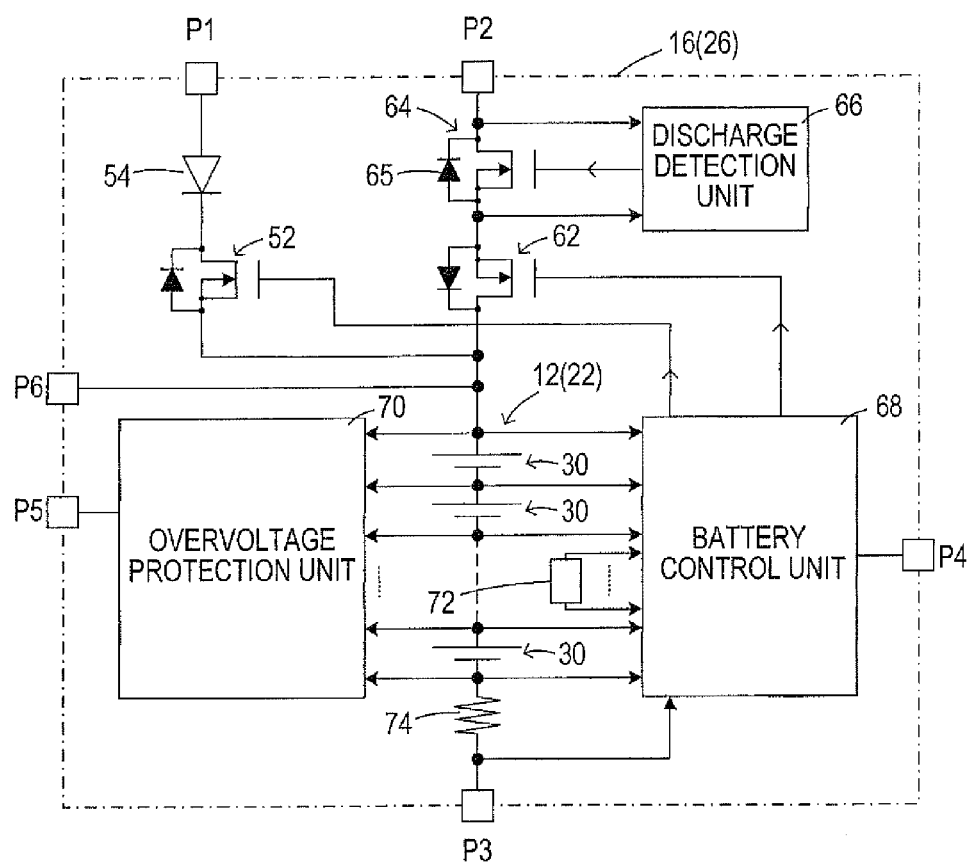
FIG. 4 is a circuit diagram showing configurations of a first block and a second block illustrated in FIG. 3.

Each of the battery 12 of the first block 10 and the battery 22 of the second block 20 comprises a plurality of cells 30 (see FIG. 4). In the case 4, the cells 30 of the first block 10 are fixed to a support member 14, whereas the cells 30 of the second block 20 are fixed to a support member 24.

In addition to the batteries 12 and 22, the case 4 houses a circuit board 40 on which circuit components to control charging and discharging of the respective batteries 12 and 22 are mounted.

Figure 3:
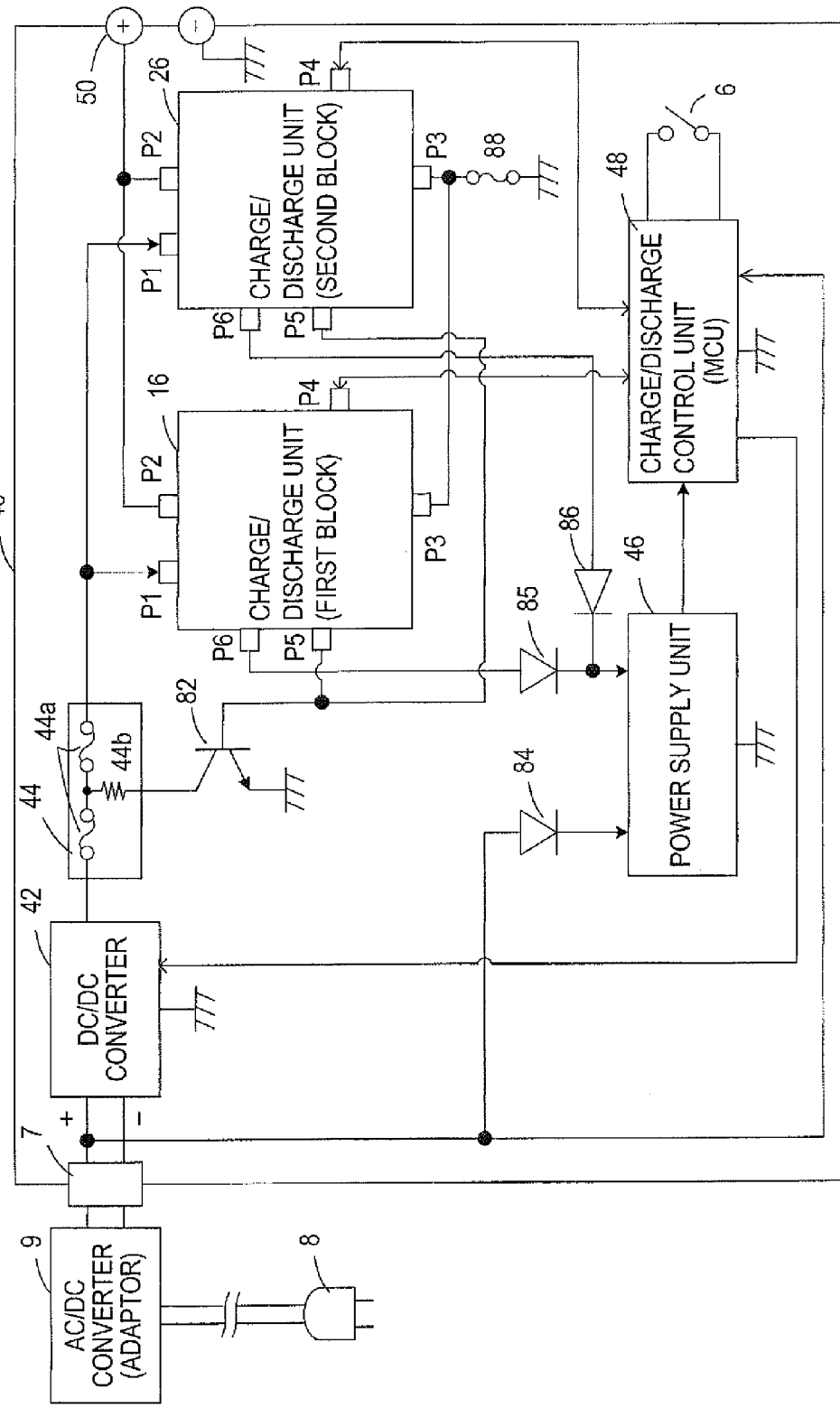
FIG. 3 is a block diagram showing a circuit configuration of the battery pack.

The circuit board 40 is a common board for a charge/discharge circuit shown in FIG. 3 and FIG. 4. In the case 4, the circuit board 40 is fixed to the support member 14 of the first block 10 and the support member 24 of the second block 20 so as to cover the batteries 12 and 22.

On an opposite side of the circuit board 40 from the batteries 12 and 22, a heat sink (not shown) for heat dissipation is arranged at a specified distance apart from the circuit board 40. Heating elements, such as an FET and the like, mounted on the circuit board 40 are fixed to the heat sink; heat from the heating elements is dissipated by the heat sink.

Next, a description will be given of the charge/discharge circuit included in the circuit board 40. As shown in FIG. 3, a first charge/discharge unit 16 provided to the battery 12 of the first block 10, a second charge/discharge unit 26 provided to the battery 22 of the second block 20, a DC/DC converter 42, a self-melting fuse 44, a power supply unit 46, and a charge/discharge control unit 48 are assembled, as a charge/discharge circuit, to the circuit board 40.

The first charge/discharge unit 16 switches between charge and discharge of the battery 12 of the first block 10, and monitors the state of the battery. The second charge/discharge unit 26 switches between charge and discharge of the battery 22 of the second block 20, and monitors the state of the battery. The first charge/discharge unit 16 and the second charge/discharge unit 26 are connected to other circuits via corresponding ports P1 to P6 comprising wiring patterns on the circuit board 40.

The port P1 is a port to input a charging voltage to the battery 12 or the battery 22; the port P2 is a port to output a battery voltage (a voltage between a positive electrode and a negative electrode of the battery 12 or the battery 22) to an output terminal 50, to which the power supply cord 5 is connected; and the port P3 is a port to be connected to a ground of the circuit board 40 via a fuse 88.

The port P4 is a port to communicate with the charge/discharge control unit 48; the port P5 is a port to output an interruption signal to interrupt a charge path to the battery 12 or the battery 22; and the port P6 is a port to output a battery voltage to the power supply unit 46.

The first charge/discharge unit 16 and the second charge/discharge unit 26 each have a configuration as shown in FIG. 4. Hereinafter, although a description will be given of the configuration of the first charge/discharge unit 16, the second charge/discharge unit 26 has the same configuration.

In the first charge/discharge unit 16, as shown in FIG. 4, the positive electrode of the battery 12 is connected to the port P1 via an FET (hereinafter referred to as a charge FET) 52 as a charge switch and a reverse flow inhibition diode 54.

The reverse flow inhibition diode 54, whose anode is connected to the port P1 and whose cathode is connected to the charge FET 52, inhibits flowing of current from the positive electrode of the battery 12 to the port P1.

The positive electrode of the battery 12 is connected to the port P2 via an FET (hereinafter referred to as a discharge FET) 62 as a discharge switch and a FET (hereinafter referred to as a reverse flow inhibition PET) 64 for inhibiting reverse flow. The reverse flow inhibition FET 64 inhibits flowing of current from the port P2 to the positive electrode of the battery 12 by means of a parasitic diode 65.

A discharge detection unit 66 is connected to both ends of the parasitic diode 65 (that is, a drain and a source of the reverse flow inhibition FET 64). When the discharge detection unit 66 detects flow of a discharge current in a forward direction of the parasitic diode 65 on the basis of a voltage value between the both ends of the parasitic diode 65, the discharge detection unit 66 turns on the reverse flow inhibition FET 64.

The positive electrode of the battery 12 is also connected to the port P6.

The first charge/discharge unit 16 comprises a battery control unit 68 and an overvoltage protection unit 70. The battery control unit 68 turns on or off the charge FET 52 and the discharge FET 62. The overvoltage protection unit 70 monitors respective voltages of the cells 30 of the battery 12 during charging of the battery 12, and stops charging if any of the cells 30 reaches an overvoltage condition.

The battery control unit 68 communicates with the charge/discharge control unit 48 via the port P4, and turns on or off the charge FET 52 and the discharge FET 62 in accordance with a command from the charge/discharge control unit 48.

Respective both-end voltage values of the cells 30 included in the battery 12, a detection signal from a temperature sensor 72 to detect a battery temperature, and a both-end voltage value (in other words, a charge current value and a discharge current value) of a resistor 74 provided in a charge and discharge path of the battery 12 are inputted to the battery control unit 68.

The battery control unit 68 outputs these inputted data to the charge/discharge control unit 48 via the port P4. Also, the battery control unit 68 monitors the remaining electric energy of the battery 12 on the basis of a value of a charge current flowing during charging to the battery 12 and a value of a discharge current flowing during discharging from the battery 12, and outputs results of the monitoring to the charge/discharge control unit 48 via the port P4.

The overvoltage protection unit 70 receives the respective both-end voltage values of the cells 30 included in the battery 12. When any of the voltage values becomes an overvoltage value larger than a value in a normal condition, the overvoltage protection unit 70 outputs an interruption signal to interrupt the charge path to the battery 12 via the port P5.

The battery control unit 68 and the overvoltage protection unit 70 comprise respective integrated circuits (ICs) having the above described functions.

Referring again to FIG. 3, in the circuit board 40, the DC/DC converter 42 and the self-melting fuse 44 are provided in a common charge path of the first charge/discharge unit 16 and the second charge/discharge unit 26 in charge paths from the charging connector 7 to the respective ports P1 of the first charge/discharge unit 16 and the second charge/discharge unit 26.

The DC/DC converter 42 increases a DC voltage (e.g., DC 12 V) supplied from the charging adaptor 9 (an AC/DC converter or the like) connected to the charging connector 7 to a DC voltage (e.g., DC 42 V) required to charge the battery 12 and the battery 22. The DC voltage generated by the DC/DC converter 42 is inputted to the respective ports P1 of the first charge/discharge unit 16 and the second charge/discharge unit 26 via the self-melting fuse 44, and is used as charging voltages to the batteries 12 and 22.

The self-melting fuse 44 comprises a fuse portion 44a that is provided in a charge path from the DC/DC converter 42 to the first charge/discharge unit 16 and the second charge/discharge unit 26, and a heating resistor 44b that generates heat to thereby fuse the fuse portion 44a when a current flows therethrough.

One end of the heating resistor 44b is connected to the charge path, whereas the other end of the heating resistor 44b is connected to the ground line via a switching element 82. The switching element 82 in the present embodiment is an NPN bipolar transistor. The respective ports P5 of the first charge/discharge unit 16 and the second charge/discharge unit 26 are connected to a control terminal (base) of the switching element 82.

Accordingly, when the first charge/discharge unit 16 or the second charge/discharge unit 26 (more specifically, the respective overvoltage protection units 70 thereof) outputs an interruption signal (at high level) via the corresponding port P5, the switching element 82 is turned on. Then, the self-melting fuse 44 fuses, and the charge path to the battery 12 and the battery 22 is interrupted.

A DC voltage inputted from the external charging adaptor 9 to the charging connector 7, a battery voltage outputted from the port P6 of the first charge/discharge unit 16, and a battery voltage outputted from the port P6 of the second charge/discharge unit 26 are inputted to the power supply unit 46 via one of reverse flow inhibition diodes 84, 85, and 86.

The power supply unit 46 generates, from the inputted DC voltage, a power-supply voltage (a DC constant voltage) to drive the charge/discharge control unit 48, the first charge/discharge unit 16, and the second charge/discharge unit 26, and supplies the generated power-supply voltage to these components.

When a DC voltage is inputted from the external charging adaptor 9 to the charging connector 7 (i.e., during charging to the battery 12 and the battery 22), the power supply unit 46 generates the power-supply voltage using the inputted DC voltage; otherwise, the power supply unit 46 generates the power-supply voltage using the battery voltage supplied from the first charge/discharge unit 16 and/or the second charge/discharge unit 26.

The charge/discharge control unit 48 comprises an MCU (Micro Control Unit), and controls charging and discharging of the battery 12 in the first block 10 via the battery control unit 68 in the first charge/discharge unit 16. Also, the charge/discharge control unit 48 controls charging and discharging of the battery 22 in the second block 20 via the battery control unit 68 in the second charge/discharge unit 26. During charging to the battery 12 and the battery 22, the charge/discharge control unit 48 activates the DC/DC converter 42 to generate a high voltage for charging.

The charge/discharge control unit 48, the battery control unit 68 in the first charge/discharge unit 16, and the battery control unit 68 in the second charge/discharge unit 26 are normally in a sleep state, in order to reduce power consumption.

When a DC voltage is inputted to the charging connector 7 from the external charging adaptor 9 or when the main SW 6 is changed from an off state to an on state by an external operation, the charge/discharge control unit 48 wakes up and executes a charge control process or a discharge control process.

Each of the battery control unit 68 in the first charge/discharge unit 16 (the first block 10) and the battery control unit 68 in the second charge/discharge unit 26 (the second block 20) is activated in accordance with an activation command transmitted from the charge/discharge control unit 48 after the charge/discharge control unit 48 wakes up.

Next, a description will be given of the charge control process and the discharge control process executed by the charge/discharge control unit 48.

Figure 5A:
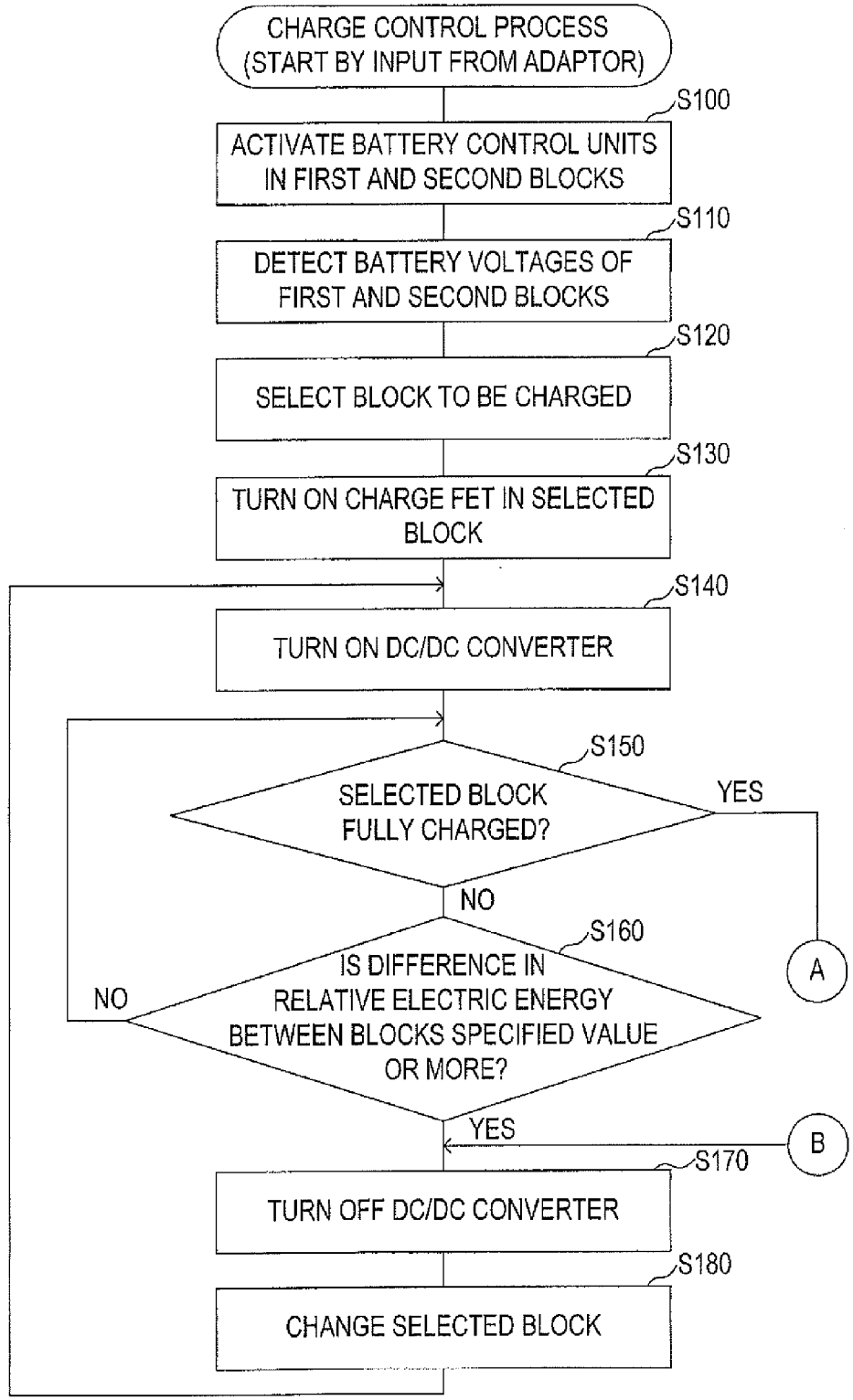
FIG. 5A is a flowchart showing a part of a charge control process to be executed by a charge/discharge control unit illustrated in FIG. 3.

As shown in FIGS. 5A and 5B, after waking up by an input of a DC voltage from the charging adaptor 9, the charge/discharge control unit 48 executes the charge control process.

In the charge control process, first in S100, an activation command is transmitted to each of the battery control unit 68 in the first block 10 and the battery control unit 68 in the second block 20, to thereby activate these battery control units 68. In subsequent S110, a battery voltage value of the battery 12 and a battery voltage value of the battery 22 are obtained respectively from the battery control unit 68 in the first block 10 and the battery control unit 68 in the second block 10, and then the process proceeds to S120.

In S120, a block to be first charged is selected from the first block 10 and the second block 20 on the basis of the respective battery voltage values obtained from the battery control units 68. That is, in the present embodiment, the battery 12 in the first block 10 and the battery 22 in the second block 20 are not charged simultaneously, but the battery 12 and the battery 22 are charged alternately. For this reason, a block having a lower battery voltage value, for example, is selected as a target of charging from the first block 10 and the second block 20 in S120.

Subsequently in S130, a command to turn on the charge FET 52 is transmitted to the battery control unit 68 in the block selected in S120 as the target of charging (hereinafter referred to as a "selected block"), to thereby turn on the charge FET 52 in the selected block.

In S140, the DC/DC converter 42 is activated to output a charging voltage from the DC/DC converter 42. As a result, charging to the battery in the selected block is started. When charging to the battery 12 or the battery 22, the charge/discharge control unit 48 performs CC-CV charging (constant-current constant-voltage charging) to the battery in the selected block by controlling the output (current and voltage) from the DC/DC converter 42.

After starting the charging to the battery in the selected block by activating the DC/DC converter 42 in S140 as described above, it is determined in S150 whether the battery in the selected block is in a fully charged state.

If the battery in the selected block is not in the fully charged state, the process proceeds to S160, in which it is determined whether a remaining electric energy PA of the battery in the selected block is larger than a remaining electric energy PB of the battery in the other block that is not the target of charging (hereinafter referred to as a "non-selected block") by a specified value or more (in other words, a difference (PA-PB) in remaining electric energy is equal to or more than the specified value).

The determination is made not on the basis of an absolute electric energy chargeable to each of the batteries 12 and 22, but on the basis of a relative electric energy with respect to a 100% electric energy when each of the batteries 12 and 22 is fully charged in later-described S200. This is intended to achieve the following: When it is detected that the remaining electric energy of the battery in the selected block calculated by a calculation method of a relative electric energy becomes larger than the remaining electric energy of the battery in the non-selected block calculated by the calculation method of a relative electric energy by a specified value or more, the target of charging is changed, to thereby make the battery 12 in the first block 10 and the battery 22 in the second block 20 fully charged at substantially the same time and complete charge control.

If it is determined in S160 that the difference between the relative electric energy of the battery in the selected block and the relative electric energy of the battery in the non-selected block is equal to or more than the specified value, the process proceeds to S170; otherwise, the process returns to S150.

In S170, the operation of the DC/DC converter 42 is stopped (turned off) to thereby stop charging to the battery in the selected block. In subsequent S180, the target of charging is changed to the battery in the non-selected block that has not been charged, and the process proceeds to S140 again.

Next, if it is determined in S150 that the battery in the selected block is in a fully charged state, the process proceeds to S190, in which it is determined whether the battery in the non-selected block is also in a fully charged state in addition to the battery in the selected block.

If the battery in the selected block and the battery in the non-selected block are both in the fully charged state, it is determined that the current charging has been completed, and the process proceeds to S200; on the other hand, if the battery in the non-selected block has not been in the fully charged state, the process proceeds to S170.

In S200, a current charged amount (in other words, a charged amount in the fully charged state) of the battery in the selected block and a current charged amount of the battery in the non-selected block are stored for comparison of the relative electric energies in S160, and then the process proceeds to S210. The charged amount can be obtained by accumulating (or adding) the charge current value during a period from the start of charging from a known electric energy (charged amount) until the fully charged state is reached.

In S210, the operation of the DC/DC converter 42 is stopped (turned off), to thereby stop charging to the battery in the selected block.

In subsequent S220, a command to turn off the charge FET 52 is transmitted to the battery control unit 68 in the selected block, to thereby turn off the charge FET 52 in the selected block.

Finally, in S230, a shift command for shifting to a sleep state is transmitted to each of the battery control unit 68 in the first block 10 and the battery control unit 68 in the second block 20, to thereby shift these battery control units 68 to the sleep state, and then the present charge control process is completed. After the charge control process is completed, the charge/discharge control unit 48 is shifted to the sleep state.

In the charge control process, as described above, charging is performed alternately to the battery 12 in the first block 10 and to the battery 22 in the second block 20. Also, the target of charging is changed when the relative electric energy of one selected battery becomes larger than the relative electric energy of the other non-selected battery by a specified value or more.

Figure 8:
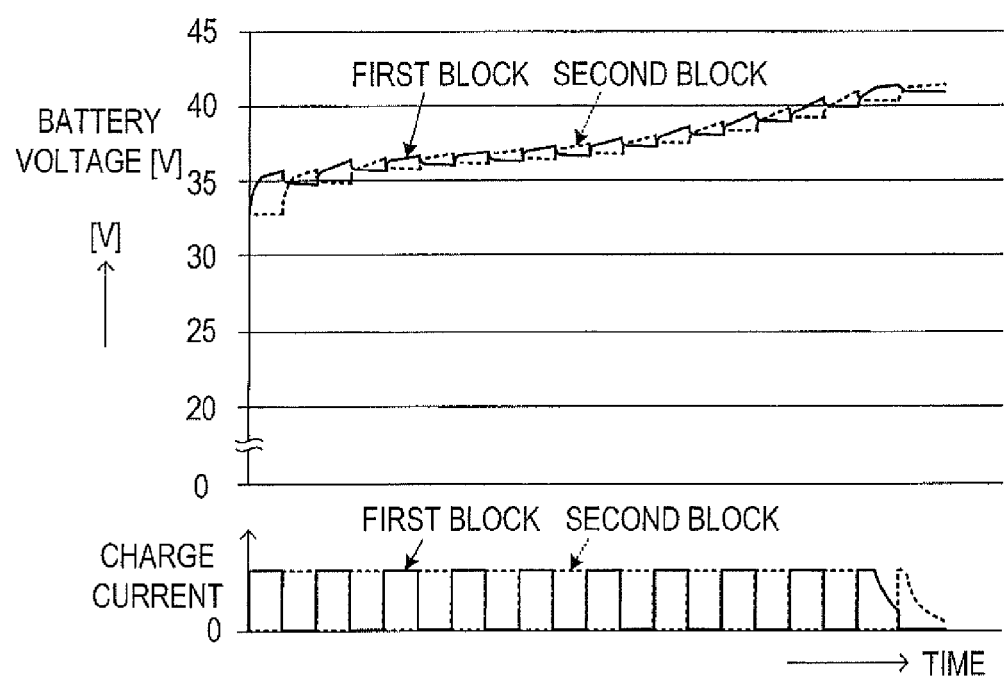
FIG. 8 is a time chart showing changes in battery voltage and charge current of the respective blocks during charging.

As a result, as shown in FIG. 8, the battery 12 in the first block 10 and the battery 22 in the second block 20 are charged alternately in a balanced manner and become fully charged at substantially the same time, and charging to the battery 12 and the battery 22 is completed.

Figure 6A:
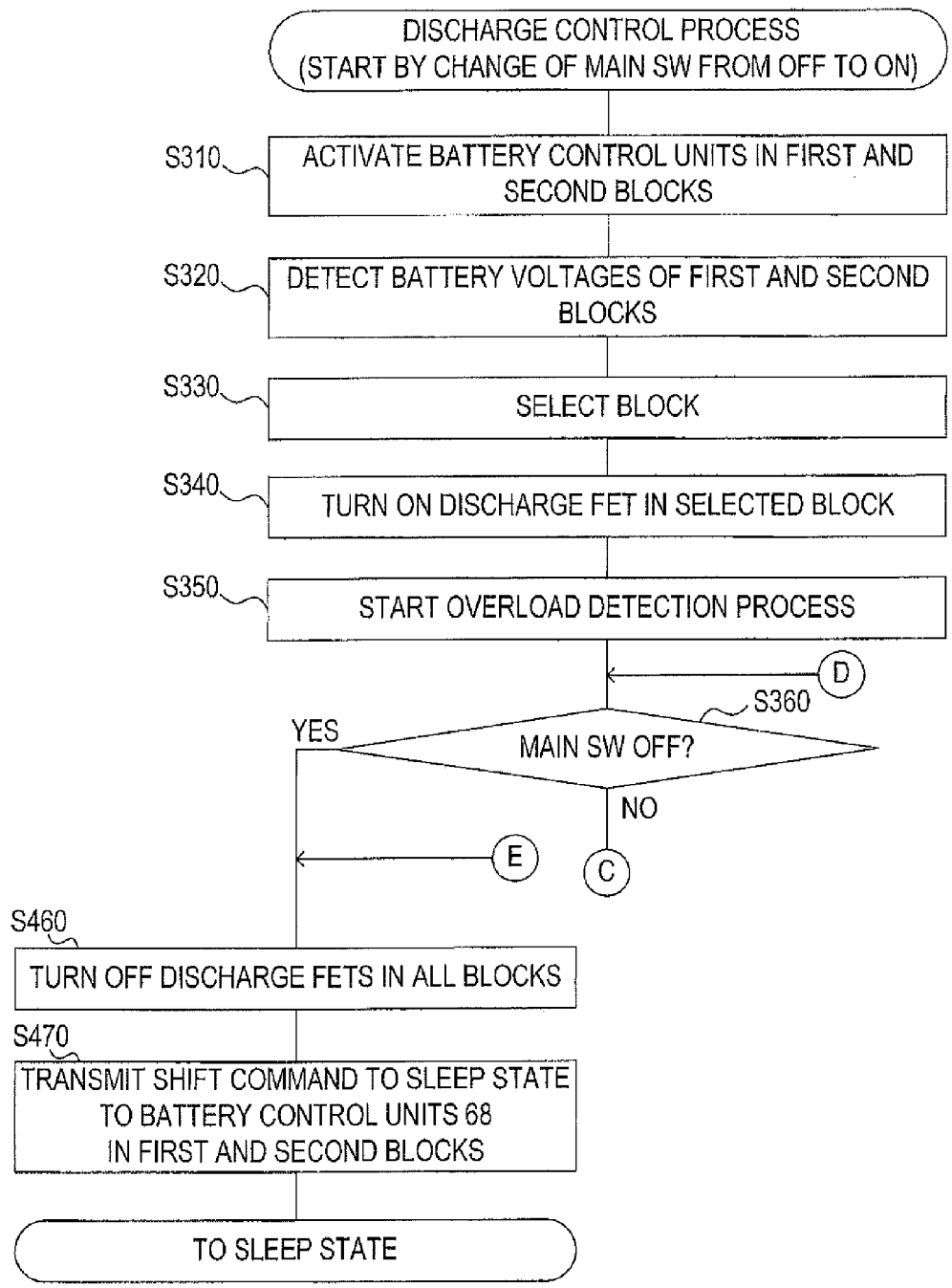
FIG. 6A is a flowchart showing a part of a discharge control process to be executed by the charge/discharge control unit.

As shown in FIGS. 6A and 6B, when the main SW 6 is changed from the off state to the on state, and thereby the charge/discharge control unit 48 wakes up, the charge/discharge control unit 48 executes the discharge control process.

In the discharge control process, first in S310, an activation command is transmitted to each of the battery control unit 68 in the first block 10 and the battery control unit 68 in the second block 20, to activate the battery control units 68. In subsequent S320, battery voltage values are obtained from the battery control units 68.

Then, in S330, a block to start discharging to an external load first is selected on the basis of the battery voltage values obtained from the battery control units 68 in S320.

That is, according to the present embodiment, power supply (i.e., discharge) to an external load is also performed alternately from the battery 12 in the first block 10 and from the battery 22 in the second block 20, in a similar manner as in the case of charging. For this purpose, in S330, one of the first block 10 and the second block 20 having, for example, a higher battery voltage value is selected as a discharge source.

In S340, a command to turn on the discharge FET 62 is transmitted to the battery control unit 68 in the selected block that has been selected as the discharge source in S330, to thereby turn on the discharge FET 62 in the selected block.

In S350, an overload detection process to detect an overload that is applied to the battery 12 in the first block 10 and the battery 22 in the second block 20 due to the discharge to the external load is started.

The overload detection process is a process to monitor respective load states of the battery 12 and the battery 22 by updating an overload counter corresponding to the battery 12 and an overload counter corresponding to the battery 22 on the basis of a value of a load current flowing from the battery 12 and the battery 22 to the external load during execution of the discharge control process. The process is executed according to the steps shown in FIG. 7.

Specifically, the overload detection process is executed alternately for the battery 12 in the first block 10 and for the battery 22 in the second block 20 in specified set time intervals. In the overload detection process, first in S510, a discharge current value is obtained from the battery control unit 68 in the first block 10 or the battery control unit 68 in the second block 20, and it is determined in S520 whether the obtained discharge current value is equal to or more than a threshold that is previously set.

If the discharge current value is equal to or more than the threshold, it is determined that a load currently applied to the battery 12 or the battery 22 is large, and the overload counter corresponding to the battery 12 or the battery 22 is incremented (+1) in S530.

If the discharge current value is less than the threshold, discharging from the battery 12 or the battery 22 is stopped or performed with only a small load, the overload counter corresponding to the battery 12 or the battery 22 is decremented (−1) in S540.

Accordingly, each of a count value of the overload counter corresponding to the battery 12 and a count value of the overload counter corresponding to the battery 22 is updated so as to increase as the discharge current to the external load is larger and a discharge time period is longer, whereas to decrease while discharge is stopped or the discharge current is smaller.

After the overload detection process is started in S350, the process proceeds to S360, in which it is determined whether the main SW 6 has been changed to the off state by an external operation.

If the main SW 6 has been changed to the off state, the process proceeds to S460, whereas if the main SW 6 has not been changed to the off state, the process proceeds to S370, in which it is determined whether a protection operation for the battery in the selected block is necessary.

The protection operation is to stop discharge when a battery as a target of protection is in an over-discharged state, a high temperature (overheated) state, or an overload state.

In S370, a battery voltage value is obtained from the battery control unit 68 in the selected block, and it is determined that the battery in the selected block is in the over-discharged state when the obtained battery voltage value is equal to or less than a specified value.

Also, in S370, a battery temperature is obtained from the battery control unit 68 in the selected block, and it is determined that the battery in the selected block is in the high temperature (overheated) state when the battery temperature is equal to or more than a specified temperature.

Further, in S370, the count value of the overload counter corresponding to the battery in the selected block, of the overload counters to be updated in the overload detection process started in S350, is read. If the read count value is equal to or more than a specified overload determination value, it is determined that the battery in the selected block is in the overload state.

As described above, if it is determined in S370 that the battery in the selected block is in the over-discharged state, the high temperature (overheated) state, or the overload state, and that a protection operation for the battery is necessary, the process proceeds to S440; otherwise, if it is determined that a protection operation is not necessary, the process proceeds to S380.

In S380, it is determined whether the external load is in a stable operating state, and thereby it is determined whether the discharge source can be changed. Specifically, for example, when a motor as the external load is in an accelerating state or a high load state, to change the discharge source from the selected block to the non-selected block may cause a change in supplied power to the external load, thus affecting the operation of the external load.

In S380, therefore, it is determined whether the external load is in a transient operation state or a high-load operation state on the basis of an amplitude of the discharge current from the battery in the selected block, and of changes in the battery voltage of the battery in the selected block; and it is determined that the discharge source can be changed when the external load is not in the transient operation state or the high-load operation state.

If it is determined in S380 that the external load is in the transient operation state or the high-load operation state, and thus the discharge source cannot be changed, the process again proceeds to S370, whereas if it is determined in S380 that the discharge source can be changed, the process proceeds to S390.

In S390, a remaining electric energy PC of the battery in the selected block is calculated. In subsequent S400, it is determined whether the remaining electric energy PC is smaller than a remaining electric energy PD of the battery in the non-selected block by a specified value or more (in other words, whether a difference between the two remaining electric energies (PD-PC) is equal to or more than the specified value).

For the aforementioned determination, absolute electric energies that can be discharged from the respective batteries 12 and 22 are used. This is to enable substantially the same electric energy to be supplied from the batteries 12 and 22 to the external load, and to achieve stable driving of the external load by changing the discharge source.

If it is determined in S400 that the difference between the absolute electric energy of the battery 12 and the absolute electric energy of the battery 22 becomes the specified value or more, the process proceeds to S410, in which the discharge source is changed from the selected block to the non-selected block. Then, the process proceeds to S360.

The change of the discharge source in S410 is performed in the following steps: The discharge FET 62 in the non-selected block is first changed to the on state, and, when the discharge from the non-selected block becomes stable after a specified time period, the discharge FET 62 in the selected block is changed to the off state.

At the moment when the discharge FET 62 in the non-selected block is changed to the on state, the discharge FET 62 in the selected block is also in the on state. Therefore, due to a voltage difference between the battery in the selected block and the battery in the non-selected block, a current flow may occur from one of the blocks to the other. However, since a time period while both of the discharge FETs 62 are in the on state is quite short, the discharge source can be changed without degrading the batteries in these blocks. The aforementioned steps are intended to inhibit instantaneous interruption or instability of power supply to the external load from being caused by changing the discharge source.

If it is determined in S400 that the difference between the absolute electric energy of the battery 12 and the absolute electric energy of the battery 22 is not equal to or more than the specified value, the process proceeds to S420, in which a no-load voltage value of the battery in the selected block is estimated.

Specifically, a battery voltage value and a discharge current value are obtained from the battery control unit 68 in the selected block, and a no-load voltage value of the corresponding battery is estimated using a preset calculation formula: "battery voltage value+discharge current value× coefficient F1+coefficient F2".

The factor F2 is an offset value to make the estimated no-load voltage value be larger than an actual no-load voltage value by a specified offset voltage (e.g., a value less than 1 V).

In subsequent S430, a battery voltage value (i.e., a no-load voltage value) is obtained from the battery control unit 68 in the non-selected block, and it is determined whether the no-load voltage value, which has been estimated in S420, of the battery in the selected block is smaller than the no-load voltage value of the battery in the non-selected block.

If it is not determined in S430 that the no-load voltage value of the battery in the selected block is smaller than the no-load voltage value of the battery in the non-selected block, the process again proceeds to S370. On the other hand, if it is determined in S430 that the no-load voltage value of the battery in the selected block is smaller than the no-load voltage value of the battery in the non-selected block, the process proceeds to S410, in which the discharge source is changed.

This is because, as shown in FIG. 9, when the remaining electric energies of the batteries 12 and 22 are small, the output voltage from the battery pack 2 rapidly decreases, and changing the discharge source in such conditions will result in a significant change in the output voltage from the battery pack 2.

That is, in the present embodiment, the difference in the no-load voltage between the battery 12 and the battery 22 is monitored by the processes in S420 and S430, and the discharge source is changed such that the difference will not become significant, to thereby inhibit significant change in the output voltage from the battery pack 2 and enable driving of the external load in a stable manner.

In S440, which is the process to be executed when it is determined in S370 that a protection operation is necessary, it is determined whether discharging from the non-selected block is possible.

If discharging from the non-selected block is possible, the process proceeds to S410, in which the discharge source is changed. Then, the process again proceeds to S370. If discharge from the non-selected block is not possible, the process proceeds to S450, in which a command to turn off the discharge FET 62 is transmitted to the battery control unit 68 in the selected block, to thereby turn off the discharge FET 62. Then, the process proceeds to S460.

In S460, both of the discharge FET 62 in the first block 10 and the discharge FET 62 in the second block 20 are turned off, to thereby stop the discharge from the battery 12 and the battery 22 to the external load. In subsequent S470, a shift command for shifting to the sleep state is transmitted to each of the battery control unit 68 in the first block 10 and the battery control unit 68 in the second block 20, to thereby shift the battery control units 68 to the sleep state. Then, the present discharge control process is terminated. After the termination of the discharge control process, the charge/discharge control unit 48 is shifted to the sleep state.

In the discharge control process, as described above, the discharge (power supply) to the external load connected to the output terminal 50 is performed, while the discharge source is changed alternately between the battery 12 in the first block 10 and the battery 22 in the second block 20. Also, the change of the discharge source is performed at the time when the remaining electric energy (the absolute electric energy) of the battery during discharging becomes smaller than the remaining electric energy (the absolute electric energy) of the other battery by a specified value or more. Accordingly, as shown in FIG. 9, the change of the discharge source will not significantly change the output voltage from the battery pack 2 to the external load; thus, stable supply of the power-supply voltage to the external load can be achieved.

As described above, the battery pack 2 of the present embodiment comprises the first block 10 and the second block 20; and the first block 10 comprises the battery 12, whereas the second block 20 comprises the battery 22.

Charging to the batteries 12 and 22 is performed for each block by alternately driving the charge FET 52 provided in the charge path of the battery 12 and the charge FET 52 provided in the charge path of the battery 22. Discharging from the batteries 12 and 22 is performed for each block by alternately driving the discharge FET 62 provided in the discharge path of the battery 12 and the discharge FET 62 provided in the discharge path of the battery 22.

A reverse flow inhibition diode 54 and a reverse flow inhibition FET 64 are provided in the charge path and in the discharge path, respectively, of each of the batteries 12 and 22.

According to the battery pack 2 of the present embodiment, therefore, simultaneous charging or discharging of the battery 12 and the battery 22 can be inhibited, and flow of current from the block having a higher battery voltage to the block having a lower battery voltage during charging or discharging can be inhibited.

Also, since the battery 12 and the battery 22 are not parallelly connected during discharging, or the battery 12 and the battery 22 are parallelly connected only instantaneously at the time of changing the discharge source, it is possible to inhibit such parallel connection from lowering inner resistance of the entire battery pack 2, thereby increasing the output voltage to the external load and degrading the external load.

At the time of charging, if the remaining electric energy (the relative electric energy) in the battery during charging becomes larger than that of the other battery by a specified value or more, the target of charging is changed. Accordingly, as exemplarily shown in FIG. 8, when charging the batteries 12 and 22, it is possible to charge the batteries 12 and 22 alternately in a balanced manner so that the batteries 12 and 22 will be fully charged at substantially the same time.

When changing the target of charging, the operation of the DC/DC converter 42 is first stopped; therefore, it is possible to inhibit occurrence of high voltage at an output side of the DC/DC converter 42 due to an interruption of an output path of the charge current during the operation of the DC/DC converter 42.

At the time of discharging to the external load, if the remaining electric energy (the absolute electric energy) of the battery during discharging becomes smaller than that of the other battery by a specified value or more, the discharge source is changed. Accordingly, as exemplarily shown in FIG. 9, when discharging to the external load, it is possible to discharge the batteries 12 and 22 alternately in a balanced manner so that discharging from the batteries 12 and 22 will finish at substantially the same time.

At the time of discharging, a no-load voltage value of the battery during discharging is estimated, and if the estimated no-load voltage value becomes smaller than the no-load voltage value of the other battery by a specified value or more, the discharge source is also changed. Accordingly, it is possible to inhibit significant change in the output voltage from the battery pack 2 when the remaining electric energy of one of the batteries 12 and 22 is small, and to continue to drive the external load in a stable manner.

When changing the discharge source, the discharge FET 62 of the battery during discharging is kept in the on state, and the discharge FET 62 of the other battery is changed to the on state, and then the discharge FET 62 of the battery that has been discharged until then is changed to the off state. Accordingly, it is possible to inhibit occurrence of a temporary stop (a so-called instantaneous interruption) of power supply to the external load due to simultaneous interruption of the discharge path from the battery 12 and the discharge path from the battery 22 when changing the discharge source.

In the present embodiment, states of the batteries 12 and 22 are monitored by the battery control unit 68 provided in the first block 10 and the battery control unit 68 provided in the second block 20. If the battery operating as the discharge source is in an over-discharged state, a high temperature (overheated) state, or an overload state, discharging from the battery is inhibited. Thus, it is possible to protect the batteries 12 and 22 from these abnormal states, and to achieve improved safety of the battery pack 2.

Also, when discharging from the battery to the external load, it is determined whether the external load is in the transient operation state or in the high-load operation state on the basis of the magnitude of the discharge current from the battery during discharging and changes in the battery voltage, and, if the external load is in the transient operation state and in the high-load operation state, the battery to be used for discharging is prohibited from being changed. Accordingly, when the external load is in the transient operation state or in the high-load operation state, it is possible to inhibit unstable power supply to the external load, which may affect the operation of the external load, by changing the battery to be used for discharge.

Further, the battery pack 2 of the present embodiment comprises the DC/DC converter 42 that converts (increases voltage in the present embodiment) a DC voltage supplied from the external charging adaptor 9, including the AC/DC converter, to a DC voltage required to charge the battery 12 and the battery 22. According to the battery pack 2 of the present embodiment, therefore, it is possible to charge the battery 12 and the battery 22 using the charging adaptor 9 having an output voltage with a voltage value different from a voltage value required to charge the battery 12 and the battery 22.

Also, since the charge path from the DC/DC converter 42 to the battery 12 and the battery 22 is shortened, it is possible to reduce voltage drop (power loss) occurring in the charge path, to thereby achieve stable and efficient charging of the battery 12 and the battery 22.

Moreover, since the output voltage of the DC/DC converter 42 may be set to a voltage required to charge the battery 12 and the battery 22, without the need to change the output voltage from the DC/DC converter 42 so as to charge a plurality of batteries having different voltages, a simplified circuit configuration can be achieved.

The self-melting fuse 44 is provided in a common charge path of the both batteries 12 and 22 in the respective charge paths from the DC/DC converter 42 to the batteries 12 and 22. When the overvoltage protection unit 70 provided for each of the batteries 12 and 22 detects abnormality in battery voltage, current flows through the self-melting fuse 44, causing the self-melting fuse 44 to interrupt the charge path.

According to the battery pack 2 of the present embodiment, therefore, it is possible to protect the batteries 12 and 22 from overvoltage via the self-melting fuse 44. Also, since the self-melting fuse 44 can collectively interrupt the respective charge paths to the batteries 12 and 22, an improved safety of the battery pack 2 can be achieved. Further, since the self-melting fuse 44 is provided in the common charge path of the batteries 12 and 22, a simplified device configuration can be achieved as compared with the case where the self-melting fuse 44 is provided for each of the batteries 12 and 22.

Separately from the overvoltage protection unit 70, the battery control unit 68 is provided to each of the batteries 12 and 22, in order to switch between charging and discharging of each of the batteries 12 and 22 and to monitor the state of the battery.

The charge/discharge control unit 48 that is common to the batteries 12 and 22 controls charging and discharging of each of the batteries 12 and 22 via the battery control unit 68 of the first charge/discharge unit 16 and the battery control unit 68 of the second charge/discharge unit 26, and thus can perform charging and discharging of each of the batteries 12 and 22 properly.

All circuits, including the DC/DC converter 42, the first charge/discharge unit 16, the second charge/discharge unit 26, and the charge/discharge control unit 48, in the battery pack 2 are assembled to the single circuit board 40. Accordingly, the battery pack 2 of the present embodiment allows easy operation of housing the aforementioned various circuits in the case as the housing of the battery pack 2, achieving an improved work efficiency when assembling the battery pack 2.

In the present embodiment, the charge FET 52 and the discharge FET 62 provided to each of the charge/discharge unit 16 and 26 in each of the blocks 10 and 20 correspond to an example of a conduction/interruption unit of the present disclosure; the battery control unit 68 corresponds to an example of a state detection unit of the present disclosure; and the charge/discharge control unit 48 corresponds to an example of a control unit of the present disclosure.

Although one embodiment of the present disclosure has been described as above, the present disclosure is not limited to the above-described embodiment, but may be in various forms within the scope not departing from the subject matter of the present disclosure.

For example, in the above-described embodiment, the reverse flow inhibition FET 64 is provided in series with the discharge FET 62, and the parasitic diode 65 of the reverse flow inhibition FET 64 inhibits current from flowing from the port P2 to the positive electrode of the battery 12 or 22.

However, in place of the reverse flow inhibition FET 64, a rectifier element (e.g., a diode) may be provided such that a current direction of a discharge current to the external load is a forward direction thereof. In this case, a switching element, such as an FET, may be connected in parallel to the rectifier element, and the switching element may be turned on by the discharge detection unit 66 when a discharge current flows.

With such configuration, it is possible to inhibit a large current from flowing in the rectifier element (the parasitic diode 65 in the above-described embodiment) by turning on the switching element by the discharge detection unit 66 in the similar manner to the case of the reverse flow inhibition FET 64 in the above-described embodiment, to thereby protect the rectifier element (the parasitic diode 65) from the discharge current.

Also, in the above-described embodiment, the overload counter counts up/down in accordance with the discharge current, in order to detect the overload state of each of the batteries 12 and 22 in the respective blocks 10 and 20. However, for example, the overload counter may be configured to count up (or be incremented) when the discharge current is equal to or more than a threshold, and to be cleared when the discharge from the battery pack 2 to the external load is finished.

Further, in the above-described embodiment, the battery pack 2 comprises the block 10 including the battery 12 and the block 20 including the battery 22, and is configured to perform charging and discharging via the charge/discharge units 16 and 26 provided for the respective blocks 10 and 20. The battery pack 2 may comprise three or more blocks. In the case where the battery pack 2 comprises three or more blocks, three or more charge/discharge units may be provided.

Moreover, in the above-described embodiment, charging is performed alternately to the battery 12 and the battery 22, and discharging is performed alternately from the battery 12 and the battery 22. However, simultaneous charging to and simultaneous discharging from the first block 10 and the second block 20 may be performed, or one of simultaneous charging and simultaneous discharging may be performed.

What is claimed is:

1. A battery pack, comprising:
   a plurality of battery blocks, each comprising a battery;
   a plurality of conduction/interruption units, each corresponding to one of the plurality of battery blocks, being configured to be selectively settable to one of a conducting state and an interrupted state, being provided between an external device to be connected to the battery pack and the corresponding battery block, and being serially connected to the corresponding battery block but not being serially connected to all of at least one remaining battery block of the plurality of battery blocks; and
   a control unit configured to select one battery block to be electrically connected to the external device from among the plurality of battery blocks on the basis of detection results obtained from a state detection unit, and to set the conduction/interruption unit corresponding to the selected battery block to the conducting state, the state detection unit being configured to detect a state of each of the plurality of battery blocks.

2. The battery pack according to claim 1,
   wherein the control unit is further configured such that, when a difference between a remaining electric energy of the selected battery block and a remaining electric energy of at least one other battery block of the plurality of battery blocks becomes equal to or more than a specified value, after the external device and the selected battery block are electrically connected, the control unit sets the conduction/interruption unit corresponding to the selected battery block to the interrupted state and sets the conduction/interruption unit corresponding to the at least one other battery block to the conducting state.

3. The battery pack according to claim 2, wherein the control unit is further configured to, when setting the conduction/interruption unit corresponding to the at least one other battery block to the conducting state, prohibit the conduction/interruption unit corresponding to the at least one other battery block from being set to the conducting state unless one of charging and discharging of the at least one other battery block is possible.

4. The battery pack according to claim 2, wherein the control unit is further configured to, when setting the conduction/interruption unit corresponding to the at least one other battery block to the conducting state, set the conduction/interruption unit corresponding to the at least one other battery block to the conducting state while keeping the conduction/interruption unit corresponding to the selected battery block set to the conducting state, and to subsequently set the conduction/interruption unit corresponding to the selected battery block to the interrupted state.

5. The battery pack according to claim 2, wherein the control unit is further configured to estimate a no-load voltage of the selected battery block on the basis of an output voltage and a discharge current of the selected battery block, and to set the conduction/interruption unit corresponding to the selected battery block to the interrupted state and set the conduction/interruption unit corresponding to the at least one other battery block to the conducting state, when the estimated no-load voltage is lower than a no-load voltage of the at least one other battery block.

6. The battery pack according to claim 2, wherein the control unit is further configured to prohibit the conduction/interruption unit corresponding to the at least one other battery block from being set to the conducting state when a current value of a discharge current from the battery pack to the external device and a variation of an output voltage from the battery pack to the external device are equal to or greater than respective thresholds.

7. The battery pack according to claim 2, further comprising:
a load state monitoring unit comprising a plurality of overload counters, each corresponding to one of the plurality of battery blocks, and being configured to monitor a load state of each of the plurality of battery blocks by incrementing each of the plurality of overload counters according to a discharge current flowing from each of the plurality of battery blocks,
wherein the control unit is further configured to, when the overload counter corresponding to the selected battery block has reached an overload count value, prohibit the conduction/interruption unit corresponding to the selected battery block from being set to the conducting state, the overload count value indicating an overload state of the corresponding battery block.

8. The battery pack according to claim 7, wherein the control unit is further configured to, when the overload counter corresponding to the selected battery block has reached the overload count value, set the conduction/interruption unit corresponding to the selected battery block to the interrupted state and set the conduction/interruption unit corresponding to the at least one other battery block to the conducting state, if the overload counter corresponding to the at least one other battery block indicates a discharge enabling count value, the discharge enabling count value representing that the corresponding battery block is dischargeable.

9. The battery pack according to claim 1, further comprising:
a plurality of sets of a rectifier element and a switching element parallelly connected to each other, each set corresponding to one of the plurality of the conduction/interruption units, each rectifier element being provided serially with respect to the corresponding conduction/interruption unit such that a direction of a discharge current to the external device is a forward direction of the rectifier element, and each switching element being configured to be selectively settable to one of a conducting state and an interrupted state; and
a plurality of discharge detection units, each corresponding to one of the plurality of sets and being configured to set the switching element of the corresponding set to the conducting state when the discharge current flows through the rectifier element of the corresponding set.

10. The battery pack according to claim 1, wherein the external device comprises one of a charger and an electric working machine.

11. The battery pack according to claim 1, wherein the external device comprises a charger configured to supply a first direct current to the battery pack, and
wherein the battery pack further comprises a DC/DC converter configured to convert the first direct current to a second direct current that is required to charge the battery in each of the plurality of battery blocks.

12. The battery pack according to claim 11, further comprising a common path interruption unit configured to interrupt a common current path, the common current path being configured such that currents flowing from the DC/DC converter to the respective plurality of battery blocks commonly flow therethrough and being provided between the DC/DC converter and the plurality of battery blocks.

13. The battery pack according to claim 11, further comprising a circuit board on which the plurality of battery blocks, the plurality of conduction/interruption units, the control unit, and the DC/DC converter are mounted.

14. A method for controlling a battery pack provided with a plurality of battery blocks, the method comprising:
providing a plurality of conduction/interruption units, each corresponding to one of the plurality of battery blocks, being configured to be selectively settable to one of a conducting state and an interrupted state, being provided between an external device to be connected to the battery pack and the corresponding battery block, and being serially connected to the corresponding battery block but not being serially connected to all of at least one remaining battery block of the plurality of battery blocks;
detecting respective states of the plurality of battery blocks;
selecting one battery block to be electrically connected to the external device from among the plurality of battery blocks on the basis of detection results of the respective states of the plurality of battery blocks; and
setting the conduction/interruption unit corresponding to the selected battery block to the conducting state.

15. The battery pack according to claim 1,
wherein the battery comprises a positive electrode, and
wherein each of the plurality of conduction/interruption units is connected to the positive electrode of the battery in the corresponding battery block.

16. A battery pack, comprising:
a plurality of battery blocks, each comprising a battery;
a plurality of conduction/interruption units, each corresponding to one of the plurality of battery blocks, being configured to be selectively settable to one of a conducting state and an interrupted state, and being provided between an external device to be connected to the battery pack and the corresponding battery block; and
a control unit configured to select one battery block to be electrically connected to the external device from among the plurality of battery blocks on the basis of detection results obtained from a state detection unit, and to set the conduction/interruption unit corresponding to the selected battery block to the conducting state, the state detection unit being configured to detect a state of each of the plurality of battery blocks,
wherein the control unit is further configured such that, when a difference between a remaining electric energy of the selected battery block and a remaining electric energy of at least one other battery block of the plurality of battery blocks becomes equal to or more than a specified value, after the external device and the selected battery block are electrically connected, the control unit sets the conduction/interruption unit corresponding to the selected battery block to the interrupted state and sets the conduction/interruption unit corresponding to the at least one other battery block to the conducting state.

17. A battery pack, comprising:
a plurality of battery blocks, each comprising a battery;
a plurality of conduction/interruption units, each corresponding to one of the plurality of battery blocks, being configured to be selectively settable to one of a conducting state and an interrupted state, and being provided between an external device to be connected to the battery pack and the corresponding battery block;
a control unit configured to select one battery block to be electrically connected to the external device from among the plurality of battery blocks on the basis of detection results obtained from a state detection unit, and to set the conduction/interruption unit corresponding to the selected battery block to the conducting state, the state detection unit being configured to detect a state of each of the plurality of battery blocks;
a plurality of sets of a rectifier element and a switching element parallelly connected to each other, each set corresponding to one of the plurality of the conduction/interruption units, each rectifier element being provided serially with respect to the corresponding conduction/interruption unit such that a direction of a discharge current to the external device is a forward direction of the rectifier element, and each switching element being configured to be selectively settable to one of a conducting state and an interrupted state; and
a plurality of discharge detection units, each corresponding to one of the plurality of sets and being configured to set the switching element of the corresponding set to the conducting state when the discharge current flows through the rectifier element of the corresponding set.

* * * * *